Dec. 30, 1947.  W. G. NEILD  2,433,621
SYSTEM FOR PARALLEL OPERATION OF GENERATORS
Filed March 2, 1944
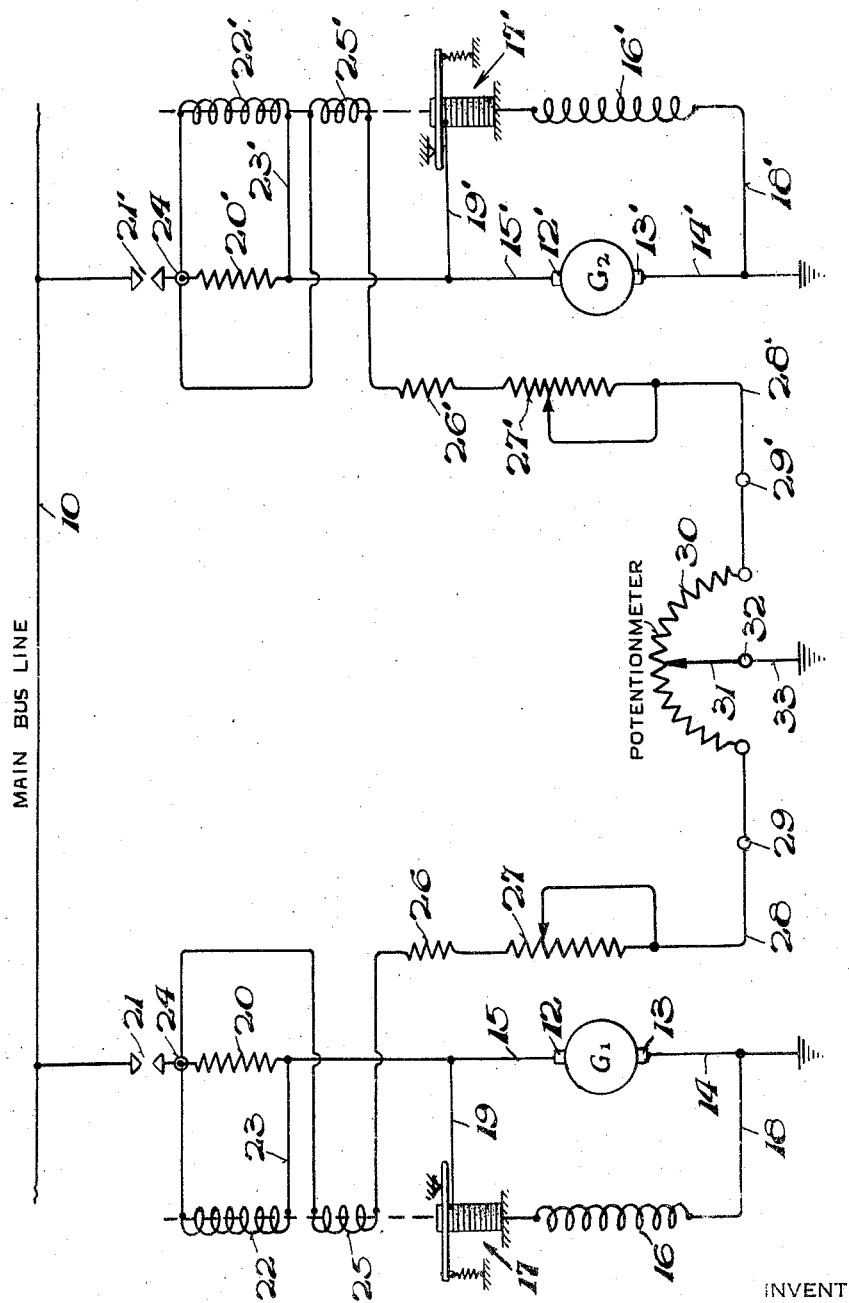
INVENTOR
William G. Neild
BY
Herbert L. Davis, Jr.
ATTORNEY Patented Dec. 30, 1947

2,433,621

UNITED STATES PATENT OFFICE 2,433,621

SYSTEM FOR PARALLEL OPERATION OF GENERATORS

William G. Neild, Warren Point, N. J., assignor to Bendix Aviation Corporation, Teterboro, N. J., a corporation of Delaware Application March 2, 1944, Serial No. 524,759

7 Claims. (Cl. 323—10)

1

The present invention deals with electrical systems and is concerned primarily with the systems of aircraft which ordinarily receive their power from a pair of generators.

At the present time two-motored planes are extensively used in the air branches of our armed forces, and are even more universally adopted in the commercial field. Ordinarily each motor of these aircraft has a generator associated therewith. Heretofore it has been the more prevalent practice to have a separate electrical system supplied by each generator, although certain arrangements by way of attempt to provide parallel operation had been proposed.

The present invention has as an important objective the provision of a system of parallel operation which is peculiarly designed to having current supplied thereto by either or both of a pair of generators and in which the operation of the generators may be maintained substantially in balance.

As a practical matter, every generator installed in an aircraft has a voltage regulator associated therewith. Ofttimes it becomes necessary to replace the regulating equipment at places not conveniently accessible to fully equipped air bases. As a result considerable difficulty has been experienced in replacing damaged or faulty regulating apparatus.

Accordingly, a further object in view is the provision of regulating apparatus for generators which is susceptible of being suitably tested at a properly equipped base and which may then be substituted for other regulating equipment at parts remote from the original testing location and only requiring the use of instruments ordinarily found on the aircraft.

A system of parallel operation, such as contemplated by this invention, presents certain decided advantages among which is noted that should either generator fail, the complete system will still be operable under the influence of the other generator. However, under ordinary conditions, it is intended that both generators supply the current, and another important object is the provision of means for so regulating the operation of this pair of generators that they are run substantially in balance. This regulating equipment is also effective to maintain substantially constant the voltage to the main bus line of the system.

Yet another object of the invention is the provision of regulating equipment for a system of the type above noted which is susceptible of being assembled in compact units and tested as such. These units may then be installed on the plane and proper adjustment between the units obtained by using the aircraft instruments.

Various other more detailed objects and advantages of the invention such as arise in carrying out the above noted thoughts in a practical embodiment will in part become apparent and in part be hereinafter stated as the description of the invention proceeds.

For a full and more complete understanding of the invention, reference may be had to the following description and drawing, wherein the figure is a diagrammatic illustration of a system of parallel operation embodying the precepts of this invention.

Referring now to the drawing, the main bus line of the electrical system, such as that found on a two-motor aircraft, is represented at 10. The chassis or frame of the aircraft constitutes the ground. Such a two-motor aircraft will ordinarily include a pair of generators which are represented at $G_1$ and $G_2$, respectively. Inasmuch as these generators are substantial duplicates, the assembly of only a single generator and the regulating equipment associated therewith is here described for the purposes of this specification.

Thus, the generator $G_1$ includes an armature 11 and brushes 12 and 13. A line 14 extends from the brush 13 to the ground, while another line 15 leads off from the brush 12. Connected in shunt across the brushes 12 and 13, are a field coil 16 and a carbon pile 17 which is the controlling element of the well known carbon pile voltage regulator shown diagrammatically herein.

It is notable that the field coil 16 and carbon pile 17 are in series with each other, although in shunt with respect to the generator. A line 18 connects one end of the coil 16 to the line 14, and another line 19 connects one end of the carbon pile 17 to the line 15.

Connected directly to the line 15 is a calibrated drop 20, which is nothing more than a fixed or constant resistance. Between this drop 20 and the main bus line 10 is a main control switch 21, which determines whether or not the generator $G_1$ is connected to the bus line.

A regulating coil 22 is hooked up in parallel with the drop 20 and is connected to the line 15 by the lead 23. The coil 22 is wound about a second regulating coil 25. The latter is connected to the joinder of the coil 22 and drop 20 as indicated at 24. In series with the inner regulating coil 25 is a ballast resistor 26 and an adjustable resistance 27. From the adjustable resistance 27 a line 28 extends to a terminal 29.

The armature 11, brushes 12 and 13, and field coil 16 are included in the generator assembly, while the carbon pile voltage regulator including the carbon pile 17, together with the calibrated drop 20, regulating coils 22 and 25, ballast resistor 26, and adjustable resistance 27, may be assembled as a single, compact unit and tested as such. When so tested, a test resistor (not illustrated) will be connected in at the terminal 29. This test resistor is, of course, not included when the regulating equipment is installed in the aircraft.

The generator $G_2$ includes elements which are the exact counterparts of those described in connection with the generator $G_1$. Thus, this generator $G_2$ will include a terminal designated 29' which corresponds to the terminal 29.

When the two regulating assemblies are installed on an aircraft, the terminals 29 and 29' will be connected to a potentiometer shown at 30. This potentiometer includes an arm 31 having a point engaging the resistance proper, and which arm is pivotally mounted as indicated at 32. The arm 31 is grounded by the connection shown at 33.

After each regulating assembly has been installed in the aircraft and properly connected up with the respective generator and the potentiometer 30, the generators may be started into operation by running the motors. By looking at the electrical meters ordinarily found on the instrument panel of the aircraft, it can be determined whether or not the generators $G_1$ and $G_2$ are running in balance. If they are not so in balance, the arm 31 may be adjusted to bring them into balance. Thus, each generator will supply its share of the current to the main bus line at the proper voltage.

While only one embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. In an electrical system, a main bus line, a pair of generators connected to said bus line in parallel, separate voltage responsive regulating equipment associated with each generator, and an adjustable potentiometer connected to and between the said regulating equipment and arranged in such a manner that simultaneous adjustment of the output of each generator in an opposite sense may be effected.

2. In an electrical system, a main bus line, a pair of generators connected to said bus line in parallel, separate regulating equipment associated with each generator; said regulating equipment comprising a carbon pile connected in series with the field coil of the respective generator, a calibrated drop, a pair of regulating coils for said carbon pile, one of the coils connected across the calibrated drop, the other of said coils responsive to the voltage output of its associated generator; the regulating equipment for each generator being connected to the regulating equipment of the other generator, and an adjustable potentiometer included in said connection and arranged in such a manner that the load may be balanced between the pair of generators through the adjustment of said potentiometer.

3. In an electrical system, a main bus line, a pair of generators connected to said bus line in parallel, each of said generators including a shunt field coil, separate regulating equipment for each generator, said regulating equipment comprising a carbon pile connected in series with the shunt field of that generator, a calibrated drop interposed between the generator and the bus line, a pair of regulating coils for said carbon pile, one superimposed upon the same magnetic circuit as the other, one of the coils connected across the calibrated drop, means connecting the other coil across the output of its associated generator, said connecting means including an adjustable potentiometer, connections leading from each side of the potentiometer to the other coil of the regulating equipment of each generator, and said potentiometer arranged in such a manner that the output voltages of the generators may be substantially equalized.

4. In an electrical system, a main bus line, a pair of generators connected to said bus line in parallel, each of said generators including a shunt and a grounded brush lead and a shunt field coil, regulating equipment for each generator comprising a carbon pile connected in series with the shunt field of that generator, a calibrated drop interposed between the generator and the bus line, a pair of regulating coils, one superimposed about the other, a ballast resistor and an adjustable resistor, said regulating equipment being assembled as a compact unit which is adapted for installation in an aircraft, an adjustable potentiometer including a swinging arm that is grounded, and a connection between each side of said potentiometer and the regulating equipment of each generator.

5. In an electrical system, a main bus line, a pair of generators connected to said bus line in parallel, each of said generators including a shunt field coil, regulating equipment for each generator comprising a carbon pile connected in series with the shunt field of that generator, a calibrated drop interposed between the generator and the bus line, a pair of regulating coils for the carbon pile, one of said regulating coils superimposed upon the same magnetic circuit as the other, one of said coils shunted across the calibrated drop, means connecting the other of said coils to one of the output lines of the generator, an adjustable potentiometer, a connection from the opposite ends of said potentiometer to an end of each of said regulating coils, and a connection leading from a point on said potentiometer intermediate the opposite ends thereof to the other output line of each of said generators.

6. In an electrical system, a main output power line, a first generator and a second generator connected to said line in parallel, a first regulating element for controlling the operation of said first generator and a second regulating element for controlling the operation of said second generator, first means responsive to the voltage output of said first generator and arranged so as to affect said first regulating element in such a manner as to maintain a predetermined voltage output from said first generator, second means responsive to the voltage output of said second generator and arranged so as to affect said second regulating element in such a manner as to maintain a predetermined voltage output from said second generator, a first current responsive means connected between said first generator and said main power line and arranged for affecting said first regulating element in such a manner as to vary the predetermined voltage output from said first generator in inverse relation to the current flow from said first generator to said main output power line, a second current responsive means connected between said second generator and said main power line and arranged for affecting said second regulating element in such a manner as to vary the predetermined voltage output from said second generator in inverse relation to the current flow from said second generator to said main power line, and said first and second current responsive means thereby cooperating with said first and second voltage responsive means in maintaining a balanced output from said first and second generators to said main power line.

7. In an electrical system, a main bus line, a pair of generators connected to said bus line in parallel, each of said generators including a shunt field coil, regulating equipment for each generator comprising a carbon pile connected in series with the shunt field of that generator, a calibrated drop interposed between the generator and the bus line, a pair of regulating coils for the carbon pile, one of said regulating coils superimposed upon the same magnetic circuit as the other, one of said coils shunted across the calibrated drop, means connecting the other of said coils to one of the output lines of the generator, an adjustable potentiometer, a connection from the opposite ends of said potentiometer to an end of each of said other regulating coils, a connection leading from a point on said potentiometer intermediate the opposite ends thereof to the other output line of each of said generators, and manually operable means for adjusting said first and second voltage responsive means so as to vary the predetermined voltage setting of one inversely in relation to the other.

WILLIAM G. NEILD.

REFERENCES CITED

The following references are of record in the file of this patent:

UNITED STATES PATENTS

| Number | Name | Date |
|---|---|---|
| 905,746 | Peek | Dec. 1, 1908 |
| 2,235,392 | Wright | Mar. 18, 1941 |
| 1,725,132 | Creveling | Aug. 20, 1929 |

FOREIGN PATENTS

| Number | Country | Date |
|---|---|---|
| 66,202 | Switzerland | Apr. 1915 |